(12) United States Patent
Porter et al.

(10) Patent No.: US 10,377,545 B2
(45) Date of Patent: Aug. 13, 2019

(54) WRAPPING MATERIALS FOR SOLID OBJECTS

(71) Applicant: L.P. BROWN COMPANY, INC., Memphis, TN (US)

(72) Inventors: Kenneth L. Porter, Hernando, MS (US); James L. Hayes, Senatobia, MS (US)

(73) Assignee: L.P. BROWN COMPANY, INC., Memphis, TN (US)

( * ) Notice: Subject to any disclaimer, the term of this patent is extended or adjusted under 35 U.S.C. 154(b) by 646 days.

(21) Appl. No.: 14/667,574

(22) Filed: Mar. 24, 2015

(65) Prior Publication Data
US 2016/0280404 A1    Sep. 29, 2016

(51) Int. Cl.
*B65H 18/28* (2006.01)
*B65D 65/02* (2006.01)
(Continued)

(52) U.S. Cl.
CPC .............. *B65D 65/14* (2013.01); *B65D 65/22* (2013.01); *B65D 71/063* (2013.01); *B65H 18/28* (2013.01);
(Continued)

(58) Field of Classification Search
CPC .... B65H 75/28; B65H 75/285; B65H 19/283; B65H 19/286; B65H 18/28;
(Continued)

(56) References Cited

U.S. PATENT DOCUMENTS 1,231,382 A * 6/1917 Knee ................... B65D 85/672
206/394
2,726,222 A   12/1955 Palmquist et al.
(Continued)

FOREIGN PATENT DOCUMENTS

AU    2005300259 B2    5/2006
AU    2008355557 B2    11/2009
(Continued)

OTHER PUBLICATIONS

The United States Patent and Trademark Office; The International Search Report and Written Opinion of the International Searching Authority, or the Declaration; International Search Report and Written Opinion for PCT/US2015/022330; dated Jun. 18, 2015; pp. 1-12; The United States Patent and Trademark Office; U.S.
(Continued)

*Primary Examiner* — Stephen F. Gerrity
*Assistant Examiner* — Joshua G Kotis
(74) *Attorney, Agent, or Firm* — Wyatt, Tarrant & Combs, LLP; Stephen C. Hall; Max E. Bridges

(57) ABSTRACT

Improved object wrapping materials exhibiting a number of beneficial properties to overcome prior deficiencies are provided. Such properties include the inclusion of a separation interface overlay that allows for greater rigidity at the leading and trailing edges of such wraps. Also, the inclusion of shear-reducing wrap material portions is described, as well as recoil reduction structures within the leading edge regions. Furthermore, core adhesive additions allow for greater resiliency to the base wrap material as it unwinds therefrom, reducing potential waste wrap products by permitting greater amounts of wrap materials in use. Other considerations include the ability, through proper configuration designs, to position a wrap separation indicator within a certain range of distances from the trailing edge, thereby (Continued)

providing greater reliability of wrap application device disengagement during wrap application. Such benefits are thus supplied individually and in tandem for improved versatility and utility of such wrap materials.

10 Claims, 12 Drawing Sheets

(51) Int. Cl.
| | |
|---|---|
| B65D 65/14 | (2006.01) |
| B65H 75/28 | (2006.01) |
| B65D 71/06 | (2006.01) |
| B65D 65/22 | (2006.01) |
| B65B 11/02 | (2006.01) |
| A01F 15/07 | (2006.01) |
| B65D 75/00 | (2006.01) |
| B65B 25/02 | (2006.01) |
| B65B 67/08 | (2006.01) |

(52) U.S. Cl.
CPC ...... B65H 75/28 (2013.01); A01F 2015/0745 (2013.01); B65B 11/025 (2013.01); B65B 25/02 (2013.01); B65B 67/08 (2013.01); B65D 75/006 (2013.01); B65H 2301/15 (2013.01); B65H 2301/41427 (2013.01); B65H 2301/414422 (2013.01); B65H 2701/1944 (2013.01)

(58) Field of Classification Search
CPC ........... B65H 2301/41424; B65H 2301/41428; B65H 2701/1944; B65H 2701/1752; A01F 2015/0745; B65B 11/025; B65D 65/14; B65D 85/672; B65D 65/02–65/24; B65D 65/38; B65D 65/40; B65D 65/42; B65D 65/406; B65D 71/063; B65D 71/066; B65D 71/08; B65D 71/10; B29C 63/0021; B29C 66/47–66/4724; B32B 3/14
USPC ..... 428/43, 167, 114; 53/399, 410; 242/532, 242/532.3, 532.4, 532.5, 532.6, 532.7; 156/42; 229/87.03, 87.05
See application file for complete search history.

(56) References Cited

U.S. PATENT DOCUMENTS

| | | | | |
|---|---|---|---|---|
| 2,999,042 | A * | 9/1961 | Meister | B29C 65/02 |
| | | | | 156/203 |
| 3,053,722 | A * | 9/1962 | Petty | B29C 53/22 |
| | | | | 156/210 |
| 3,072,512 | A * | 1/1963 | Dalle Yves | B29C 35/08 |
| | | | | 442/3 |
| 3,150,029 | A * | 9/1964 | Ferrand | A01G 27/04 |
| | | | | 156/296 |
| 3,162,393 | A * | 12/1964 | De Gelleke | B65H 19/28 |
| | | | | 242/526 |
| 3,349,765 | A | 10/1967 | Blanford | |
| 3,369,766 | A * | 2/1968 | Herman | B65H 19/26 |
| | | | | 242/527.1 |
| 3,457,919 | A * | 7/1969 | Harbard | A61F 13/023 |
| | | | | 427/2.31 |
| 3,735,865 | A * | 5/1973 | Smith | B65D 83/0805 |
| | | | | 206/390 |
| 3,746,607 | A * | 7/1973 | Harmon | A61F 13/00008 |
| | | | | 26/72 |
| 3,942,713 | A | 3/1976 | Olson et al. | |
| 4,041,201 | A | 8/1977 | Wurker | |
| 4,050,121 | A | 9/1977 | Richman | |
| 4,127,132 | A | 11/1978 | Karami | |
| 4,201,352 | A * | 5/1980 | Madachy | B21C 47/006 |
| | | | | 242/419.4 |
| 4,258,846 | A * | 3/1981 | Campo | B65H 18/28 |
| | | | | 206/412 |
| 4,338,084 | A | 7/1982 | Berthelsen | |
| 4,343,132 | A | 8/1982 | Lawless, Jr. | |
| 4,349,163 | A * | 9/1982 | Wise | B65H 19/28 |
| | | | | 242/575.4 |
| 4,416,392 | A | 11/1983 | Smith | |
| 4,605,577 | A | 8/1986 | Bowytz | |
| 4,688,368 | A | 8/1987 | Honegger | |
| 4,768,810 | A | 9/1988 | Mertens | |
| 4,778,701 | A | 10/1988 | Pape et al. | |
| 4,801,480 | A | 1/1989 | Panza et al. | |
| 4,917,928 | A | 4/1990 | Heinecke | |
| 4,941,882 | A | 7/1990 | Ward et al. | |
| 5,057,097 | A | 10/1991 | Gesp | |
| 5,080,254 | A | 1/1992 | Feer | |
| 5,221,393 | A | 6/1993 | Heutschi | |
| 5,234,517 | A | 8/1993 | Pape et al. | |
| 5,324,078 | A | 6/1994 | Bane | |
| 5,365,836 | A | 11/1994 | Campbell | |
| 5,413,656 | A * | 5/1995 | Kuhnhold | B65H 19/286 |
| | | | | 156/184 |
| 5,472,089 | A * | 12/1995 | Specogna | G03B 27/588 |
| | | | | 206/410 |
| 5,496,605 | A * | 3/1996 | Augst | A61F 13/0273 |
| | | | | 206/447 |
| 5,497,903 | A | 3/1996 | Yoneyama | |
| 5,520,308 | A | 5/1996 | Berg, Jr. et al. | |
| 5,591,521 | A | 1/1997 | Arakawa et al. | |
| 5,646,090 | A * | 7/1997 | Tamura | B41M 5/44 |
| | | | | 428/195.1 |
| 5,660,349 | A * | 8/1997 | Miller | B65H 19/2223 |
| | | | | 242/526.1 |
| 5,885,679 | A | 3/1999 | Yasue et al. | |
| 5,979,141 | A | 11/1999 | Phillips | |
| 6,008,429 | A | 12/1999 | Ritger | |
| 6,153,278 | A | 11/2000 | Timmerman et al. | |
| 6,295,758 | B1 * | 10/2001 | Weder | A01G 5/04 |
| | | | | 47/41.01 |
| 6,453,805 | B1 | 9/2002 | Viaud et al. | |
| 6,467,719 | B1 * | 10/2002 | Rodriguez | B65H 19/267 |
| | | | | 242/521 |
| 6,514,585 | B1 | 2/2003 | Pearson et al. | |
| 6,550,633 | B2 | 4/2003 | Huang et al. | |
| 6,550,634 | B1 | 4/2003 | Alegre De Miquel et al. | |
| 6,632,311 | B1 | 10/2003 | Glenna et al. | |
| 6,644,498 | B1 | 11/2003 | Lemberger et al. | |
| 6,663,932 | B2 | 12/2003 | McLaughlin et al. | |
| 6,685,050 | B2 | 2/2004 | Schmidt et al. | |
| 6,756,096 | B2 | 6/2004 | Harding | |
| 6,787,209 | B2 | 9/2004 | Mass et al. | |
| 6,901,723 | B2 | 6/2005 | Jordan et al. | |
| 6,971,542 | B2 | 12/2005 | Vogel et al. | |
| 7,165,928 | B2 | 1/2007 | Haverdink et al. | |
| 7,541,080 | B2 | 6/2009 | Mass et al. | |
| 7,625,332 | B2 * | 12/2009 | Mass | A01F 15/0715 |
| | | | | 428/56 |
| 7,636,987 | B2 | 12/2009 | Derscheid et al. | |
| 7,694,491 | B2 | 4/2010 | Noonan et al. | |
| 8,071,196 | B2 | 12/2011 | Goering | |
| 2002/0172792 | A1 | 11/2002 | Jarvis et al. | |
| 2002/0182367 | A1 * | 12/2002 | Salzsauler | B29C 47/00 |
| | | | | 428/77 |
| 2003/0000934 | A1 * | 1/2003 | Tanaka | B29C 65/02 |
| | | | | 219/244 |
| 2003/0059566 | A1 * | 3/2003 | Chien | B65D 5/0236 |
| | | | | 428/43 |
| 2004/0121108 | A1 * | 6/2004 | Mass | A01F 15/071 |
| | | | | 428/57 |
| 2005/0034429 | A1 | 2/2005 | Mass et al. | |
| 2005/0155714 | A1 * | 7/2005 | Adams | B65H 19/10 |
| | | | | 156/443 |
| 2007/0152010 | A1 | 7/2007 | Denen et al. | |
| 2007/0240389 | A1 | 10/2007 | Frerichs | |
| 2008/0003403 | A1 * | 1/2008 | Garegnani | B65D 71/0088 |
| | | | | 428/131 |

(56) References Cited

U.S. PATENT DOCUMENTS

| | | | | |
|---|---|---|---|---|
| 2008/0245923 | A1* | 10/2008 | Maddaleni | B65H 19/2269 242/610.1 |
| 2008/0280098 | A1* | 11/2008 | Papadopoulos | B65D 71/0088 428/138 |
| 2009/0274881 | A1* | 11/2009 | Mass | C09J 7/0207 428/195.1 |
| 2009/0302147 | A1* | 12/2009 | Emoto | B65H 19/28 242/532.6 |
| 2010/0237179 | A1* | 9/2010 | De Matteis | B65H 19/2269 242/521 |
| 2011/0133015 | A1* | 6/2011 | Gelli | B65H 19/2269 242/521 |
| 2011/0309544 | A1* | 12/2011 | Hupp | B65H 35/08 264/156 |
| 2011/0311749 | A1 | 12/2011 | McNeil et al. | |
| 2012/0148783 | A1 | 6/2012 | Kunkleman | |
| 2013/0143001 | A1* | 6/2013 | Manifold | D06C 23/04 428/167 |
| 2013/0221078 | A1 | 8/2013 | Skelton | |
| 2013/0248643 | A1* | 9/2013 | Newhouse | B65H 19/20 242/526 |
| 2013/0320124 | A1* | 12/2013 | Rochon | B65H 19/28 242/160.3 |
| 2014/0263590 | A1 | 9/2014 | Skelton | |
| 2014/0352263 | A1* | 12/2014 | Harchol | A01F 15/071 53/466 |
| 2014/0370224 | A1* | 12/2014 | Kien | B26F 1/14 428/43 |
| 2015/0030812 | A1* | 1/2015 | Teal | F16L 57/00 428/167 |
| 2015/0274483 | A1* | 10/2015 | Newhouse | B65H 19/28 242/613 |
| 2016/0151994 | A1 | 6/2016 | Castillo et al. | |
| 2016/0177135 | A1 | 6/2016 | Allen | |
| 2018/0086581 | A1* | 3/2018 | Hays | B65H 18/00 |

FOREIGN PATENT DOCUMENTS

| | | | | |
|---|---|---|---|---|
| EP | 1584574 | A2 * | 10/2005 | ........... B29C 66/221 |
| GB | 2233962 | A2 | 1/1991 | |
| WO | 9813636 | A2 | 4/1998 | |
| WO | 0061359 | A2 | 10/2000 | |
| WO | 0061359 | A3 | 10/2000 | |
| WO | 2015010151 | A1 | 1/2015 | |
| WO | WO-2015024052 | A1 * | 2/2015 | ............. B65D 65/14 |

OTHER PUBLICATIONS

The United States Patent and Trademark Office; The International Search Report and Written Opinion of the International Searching Authority, or the Declaration; International Search Report and Written Opinion for PCT/US17/53748; dated Feb. 9, 2018; pp. 1-16; United States Patent Office; US.

* cited by examiner

US 10,377,545 B2

WRAPPING MATERIALS FOR SOLID OBJECTS

FIELD OF THE INVENTION

The invention herein pertains to improved bale wrapping materials exhibiting a number of beneficial properties to overcome prior deficiencies. Such properties include a separation interface overlay that allows for greater rigidity at the formed leading and trailing edges of such wraps. Also, the inclusion of shear-reducing wrap material portions is described, as well as recoil reduction structures within the formed leading edge regions. Furthermore, roll core adhesive additions allow for greater resiliency to the base wrap material as it unwinds therefrom, reducing potential waste wrap products by permitting greater amounts of wrap materials in use. Other considerations include the ability, through proper configuration designs, to position a wrap separation label within a certain range of distances from the formed trailing edge, thereby providing greater reliability of wrap dispensing during use. Such benefits are thus supplied individually and in tandem for improved versatility and utility of such wrap materials. Such wrapping materials may be used in conjunction with any solid objects that are typically collected, transported, and/or stored in such a manner.

BACKGROUND OF THE INVENTION

Objects, including agricultural crops, fabrics, paper products, plastic products, basically any solid object, are typically provided in some manner that requires, at some point in time, wrapping of individual or multiple articles. Such wrapping, whether within a plastic or polymer film, a netting, a mesh, or any like segmented web of material, is applied in such a fashion to facilitate collection, storage, transport, basically any type of protective activity for such objects. Whether it relates to a plastic film surrounding a plurality of filled and sealed water bottles, shrink-wrap films over boxes containing electronic equipment, packaging covering meat, vegetables, and the like, in a supermarket, even, as more fully described below, agricultural crop bales, wrapping materials have long been utilized for such valuable reasons.

As one example, agricultural crops are typically harvested and collected into bales to facilitate transport and ultimate introduction within a processing machine (for instance, cotton is baled for transport to a gin). To do so, wrapping articles have been provided to accommodate such necessary activities, particularly to ensure such crops are kept together during transport, as well as to allow for proper measurement of the amount actually harvested and transported. In any event, such wrapping articles have become a mainstay within the agricultural industry.

In the recent past, developments have been undertaken to improve certain machinery for the actual harvesting of such crops (particularly, though not limited to, cotton, as one example). Such machinery allows for the continuous harvesting and collecting of crops into bales that can then be wrapped with suitable materials within the machine itself. In the past, baling would be undertaken and wrapping (or covering) would be accomplished separately. These newer devices thus have permitted simultaneous harvest and wrapping for greater efficiencies, at least. When transported to a processing location (again, for example, a cotton gin), the wraps are then removed and the collected crops are allowed to feed into the processing machinery. Such wraps are thus utilized for simplification and streamlining of the overall procedure, again, particularly in tandem with such new harvesting machines in the field.

Such wraps as typically used today, however, exhibit a number of drawbacks that lead to undesirable issues. Notably, there are currently in use wrapping materials that include adhered-to portions that require totally separated lengths of polymer materials during manufacture. Such materials, again, using cotton as one non-limiting example, have been developed to comply with certain requirements associated with such harvesting machines. For instance, in order to allow for effective wrapping and release of such materials (to permit further wrapping of subsequent bales), and, in particular, to allow for such wrapping materials to cover the circumference of a cylindrical bale at least two and preferably at least three times, the baling machine must include a clutch/brake mechanism to separate the wrap portion from its roll, and to permit feed of the trailing edge and separation from the subsequent leading edge. This step thus ultimately permits the wrapping materials to unwind properly around the bale and then separate from the roll itself and adhere the trailing edge (separated from the roll) to the rolled bale surface. This secures the wrapping material around the subject bale, in other words, and allows access to a new leading wrapping material edge to initiate rolling around a new bale within the harvesting machine.

These wrap structures, in use today, require the use of a folding of the web of wrap material over an adhesive layer to accommodate the protection of the adhesive layer, the braking and pulling of wrapping material a certain distance for such trailing edge adherence, and provision of a leading edge of a new wrap portion. This structure, though, as noted above, requires separate wrap portions from the outset held together solely by adhesives on the base roll. The manufacturing limitations are evident as the separated components necessitate a great deal of complex activity and monitoring to ensure proper results. The adhesive edges further may exhibit undesirable results during actual utilization in that preliminary contact between an adhesive edge with a portion of the baled structures, or even potential adhesion to the baling machine itself, may result in problematic jamming of the machine (or other problems). Improvements to such a difficult-to-use structure are thus sought within this industry.

Certain changes have been proposed, including the production of a continuous web of wrapping materials that including scoring or other type of separation means between suitable lengths of wrapping materials. Adhesives may be utilized to accord proper attachment of trailing edges of material subsequent to tearing from the base web, as well.

Unfortunately, it has been realized that such continuous web structures may still exhibit undesirable results that could affect the overall capability and reliability of the utilization of such wrapping materials with all-in-one harvesting machines. Most notably, perhaps, and as for the deficiencies of the separate wrap material structures noted above, is the potential for leading edges of the wrap rolls to become engaged, adhered to, or otherwise entangled with the harvesting machine upon separation of the trailing edge of a wrap. In this type of situation, basically, the leading edge exhibits a loose "flap" that is at the mercy of the environment within and around the baling machine. Fibrillation or even recoil of the wrap material at the separated leading edge may occur that can cause a number of problems. In essence, the typical wrap material is limited to a substrate structure that is prone to uncontrolled movement and/or recoil upon separation from the overall web (or, from adherence to the trailing edge). This structure thus may have nibs (if it is associated with a scored roll, for instance) that may be drawn into the baler machinery, or, otherwise, may simply be drawn as an entire leading edge therein. As well, such leading edge nibs may exhibit weaker adhesive capability upon application to a bale, or, vice-versa, the trailing edge may not exhibit suitable adhesive properties to remain in appropriate contact with the wound wrap already present on a subject bale. This could lead to undesirable unwrapping from around such a bale, among other things. Alternatively, with a recoil possibility, the leading edge portion may engage with the rubber dispenser rollers of the harvesting machine, leading to, as noted, undesirable results. In either case, if the wrapping material becomes entangled to such an extent with the machinery, the remedy is far more involved than simply reaching in and manually removing the leading edge from the baling portions of the harvesting machine; to the contrary, such a machine must be shut down and removal then undertaken. In any event, such a potential problem is significant and could easily compromise the efficiency aims of the utilization of such a wrapping material in conjunction with the harvesting machine.

Another notable problem with the standard baling wraps of today is the potential for slippage or expansion when placed around a bale. Any distortion due to uneven application or weakened regions around the bale itself could lead to the overall shape of the bale being compromised and further introduction within a specifically shaped transport and/or placement within a processor thereafter may be complicated or even prohibited, not to mention failure of the wrap to actually cover the subject crops from the elements during presence in a field while awaiting transport. In essence, such prior wrapping materials are prone to uneven stresses around a target bale. Coupled, for example, with typical trailing and leading edge separation portions (nibs, for instance, as discussed above), the lack of effective adhesive stress points (such as shear and peel strengths) may cause the wrap material to disengage from around the subject bale, again leading to significant difficulties, particularly in the field. As such, there exists a need to overcome this drawback, but with a structure that may be manufactured in such a manner as to provide a solution thereto, rather than an external application subsequent to bale wrapping. So far, there have been no suggestions as to improvements for this type of problem with the crop wrap material marketplace.

Another problematic issue, particularly associated with the prior folded wraps noted above, is the need for a significant amount of unused wrap at the end of the entire roll. Such an excess portion is needed, typically, to provide sufficient back tension to open the folded web. Such an amount of extra material, however, has proven to contribute to undesired feed within the harvesting machine (as above, for example, for the recoil situation) and/or provides an amount of unused wrapping material that is simply discarded at the site (in the field). Such an amount is highly undesirable as it provides waste within the overall procedure as well as the potential for the same machine entanglement that requires significant time and resources to remedy in the field. Thus, there is a need to provide some type of manner of avoiding such problems.

Additionally, then, there exists a noticeable problem in terms of proper notification of machine activation for roll dispensing. Such a harvesting machine, as alluded to above, generally requires a clutch/brake activation scheme to ensure proper roll management of the wraps themselves. Without proper undertaking of such a procedure, the overall application of wrapping material would be incredibly difficult as the continuous feed of wrap would occur, leaving no room for actual separation of trailing and leading edges. Thus, in order to ensure the activation of a clutch/brake mechanism, labels have been generated and applied to specific locations on a trailing edge. Such labels, including, for instance, bar codes, QR codes, and the like, activate the clutch/brake once proper reading and notifying is provided to the harvester to allow for a set amount of time to stop the wrap cycle and allow for wrapping of the subject bale. These labels are typically applied at a set distance from the trailing edge for proper wrap separation (of folded wrapping materials, for instance) and sequential contact to adhere to the wrap material already in place on the round bale. As of today, the placement of such a label at a distance that activates the clutch/brake at an "improper" location would prevent proper adhesion, etc., from occurring. However, the ability to place a label at any location on the trailing edge of a wrap material could permit greater control and effect without any need for unfolding or extension of certain wrap materials. Greater versatility would be welcome, certainly, in respect to this issue within the baling industry.

For that matter, however, other types of materials utilized to wrap other solid objects exhibit similar deficiencies. The invention described herein is thus not limited to agricultural wrap materials, but any type of material utilized for typically wrapped solid objects. Unfortunately, as it concerns these noticeable deficiencies within the prior wrap material art, the needed improvements have yet to be described, let alone provided to remedy such problems. The inventive bale wraps provided herein, however, accord the necessary improvements to accomplish such effects.

Advantages and Summary of the Invention

An advantage of the present invention is the drastic reduction of the propensity of such a wrapping material to exhibit recoil and/or undesired feed within a baling machine upon separation of a trailing edge from a leading edge. Another advantage is the ability to provide greater uniformity of such a finished wrap in terms of bale coverage with significantly reduced capability of bale size distortion during application and afterwards during storage and transport. Yet another advantage of the present invention is the reduction in waste material usage without losing back tensioning during utilization thereof such that substantially similar force is applied to the wrap when nearing its total unwound state from the base core. Still another advantage is the ability to apply a control label at multiple locations at the trailing edge of such wrap material.

Accordingly, the present invention encompasses a roll of continuous wrapping material provided around a cylindrical core including a plurality of successive wrapping segments with a first wrapping segment, a series of middle wrapping segments, and a last wrapping segment attached to said cylindrical core, said wrapping segments being connected to each successive segment through periodic separable connections, wherein each of said wrapping segments has a leading section, a trailing section, and a body section therebetween, wherein said wrapping segment leading section extends from a leading edge to said body section, wherein said trailing section leads from said body section to a trailing edge, wherein said body section exhibits a width that is wider than the width of said leading section at its leading edge, wherein said configuration of said trailing edge is complementary to said configuration of said leading edge, wherein said leading edge of each wrapping segment is adjoined to said trailing edge of a different wrapping segment through said periodic separable connections other than the leading edge of said first wrapping segment and the trailing edge of said last wrapping segment, and wherein each of said adjoined leading and trailing edges are covered by an overlay including separable connections aligned with said separable connections between said leading and trailing edges. Also included herein is roll of wrapping segments as described above, wherein said overlay is optional, and wherein said body section includes rigidifying additions present therein. Further included within this invention is the wrapping material roll as described above including an indicator included within any location within said trailing section thereof to create a signal to control activation of the rolling device itself, with said overlay and said rigidifying additions being optional components. Additionally, this wrapping material roll as described above, and including any or all of the overlay and rigidifying additions noted above, wherein said last wrapping segment is attached directly to said cylindrical core. The method of wrapping at least one solid object (such as, without any limitation intended, an agricultural bale, like cotton) within a wrap application device (such as, again, without any limitation intended, a harvesting device) with at least one wrapping segment of the inventive wrapping material rolls described above is also encompassed within this invention.

Such materials are typically provided as continuous webs of mesh, film, fabric, composite, and the like, with separable connections between adjoining wrapping segments (such as, without limitation, scoring, dotting, perforations, slits, etc.) introduced during manufacture. As well, any surface additions, including edge overlays, resiliency/rigidifying structures (longitudinal, crisscross, wave, circle patterns, etc.) are introduced during material manufacture as well. Such overlays would include scoring, dotting, slitting, perforations, and the like, as described in greater detail below, subsequent to introduction to the web surface. The very end of a selected web distance (in order to wind onto a roll core, for instance) may be cut into a selected end shape of any geometry and provided with adhesive to attach to a core, as well. The terminal edge of the subject wrap includes double-sided adhesive to releasably attach to the core and, upon removal from such a core, the other side can then adhere to the outer surface of the subject wrapped bale, as well. Such a core is typically a cardboard or plastic cylinder of a certain diameter in order to allow unwinding of the wrap material at desired rates and distances. Lastly, the web material may be etched, dyed, or otherwise applied with a label during manufacture at selected locations at the trailing edge of each wrap segment to wrap around a subject bale (or like harvested crop article).

The term "continuous roll" or "continuous web" used herein is intended to mean a single piece of wrap material that has been provided with separable connectors integrated therein to allow for separation of segments within such a single piece of material. "Separable connectors" or like descriptions are intended to mean, as noted above, integrated structures within a single material piece that facilitate separation of segments through application of a pulling force on a leading segment and an opposing (not necessarily equal) force on the trailing segment. Such connectors may thus include, without limitation, scoring, dotting, slits, perforations, and the like. Such connectors are unique to such wrap materials, particularly as they would include an overlay that overlaps with a trailing edge and an adjacent (until separation) leading edge of connected wrap material segments. Such an overlay may be applied on the top side or the bottom side (or both) of such a wrap material in such a manner, as well, in order to accord, as described herein, resiliency to each of such trailing and leading edges after separation. The increased bulk provided to such edges prevents undesirable recoil and/or loose "flapping" or elongation of the edges upon separation, thus preventing and/or drastically reducing the propensity for such loose edges to enter or otherwise entangle with the rolled bale or harvesting machine components (particularly rubber dispenser rolls). Additionally, such a loose edge, even with an adhesive component applied thereto, is susceptible to folding over onto itself (leaving little to no exposed adhesive for actual connection and attachment with a bale), as well as possible adhering to a separated wrap portion, or even to machinery components. In any case, the need to ensure such leading and tailing edges are properly presented with reduced propensity for such undesirable adhesion potentials has led to the realization that an overlay covering such edges can overcome these deleterious effects. Thus, the utilization of a material, such as, without limitation, a one-sided adhesive "tape" (with the adhesive side applied on the top or bottom side of the web, or possibly both sides simultaneously), a polymer strip attached to such single or both sides, or any other like material for such a purpose (including staggered strips, dots, and the like, that extend from the base wrap over any elongations created from separate of the connectors), accords such a beneficial result. Additionally, such overlay structures may be of natural or synthetic constituents (or blends thereof, for that matter) and may be adhered, bonded, welded (such as sonically welded), or otherwise connected to the subject wrap material. The separation of web component segments is thus allowed with the same degree and placement of scoring, dotting, slits, perforations, and the like, within the web structure, as well. Although any geometric shape may be utilized for such an inventive wrap configuration, in order to accord the most reliable leading edge configuration, it was realized that a "chevron" shape would be preferred, with a pointed structure utilized at the leading edge. The trailing edge thus exhibits a pointed inverse structure, allowing for such a chevron shape to be provided upon separation from a successive wrap segment. The overlay structure thus will be applied to overlap such trailing/leading edges in the same general configuration in use. If the pointed structure is in place, then, the overlay will take the same shape and accord such a cover that has, included therein, the necessary scoring, dotting, slits, perforations, etc., as desired for such wrap segment separation purposes. The scoring, dotting, slits, perforations, etc., are thus preferably introduced linearly in relation to the desired edge shape (pointed structure, for instance) with any degree of coverage of the edge over the base material (preferably, though not necessarily, however, roughly half of the overlay covering the leading edge and roughly half then covering the trailing edge could be utilized). Upon separation of the wrap segments, then, the overlay remains over the covered portion of the trailing edge and as well over the leading edge of the next wrap segment (and thus preventing undesirable recoil, elongation, etc., in such a situation). Such an overlay may be of any typical structure that is capable of adhering or otherwise attaching to such a base web material, and also allows for scoring, dotting, slits, perforations, etc., there through itself as well as the base web material simultaneously during manufacture. Such overlay materials thus may be selected from the group of paper, polymeric, or fibrous backed adhesive tapes or material suitable for thermal attachment to the wrap web.

Additionally, or separately, the invention encompasses the utilization of extra material within selected regions of the base web material in order to accord resiliency to the overall structure thereof when wrapped around a subject bale. As noted above, if such a web material exhibits undesirable distortions or uneven tension over any portion of a subject bale, the overall wrap may distort as well, leaving the bale susceptible to uneven shaping or even uncovered portions. If the wrapped bale remains in a field for an indefinite time period prior to transport for processing, the lack of wrap coverage could be disastrous. As well, if the transport device cannot properly maneuver, lift, or otherwise move such a wrapped bale due to unevenness in overall shape, loss of product may result as the lack of transport capability would force drastic measures or even a decision to leave such an uneven roll in the field. Thus, it was realized that such a wrapping material could be invigorated to militate against such a potential deleterious result. The inclusion of an extra amount of material, either through an attached strip of resilient polymer or other like article, or even through thickened regions of polymeric material within the subject web, all within the body of a wrap segment, has been found to provide such beneficial properties. Such extra material may be present as longitudinally applied strips or thickened portions a certain distance from the longitudinal edges of a subject wrap material web (such as about 3 inches wide, about 2-4 inches from the longitudinal edges of the web, as examples). Alternatively, as alluded to above, the extra material amounts may be provided as geometric strip shapes throughout the web body, particularly, in one potentially preferred configuration, as crisscross patterns within the web material itself. In any event, such a geometric strip (or thickened regions) within the material web accords resiliency within the overall wrap to retain a certain tension and thus shape around a rolled bale. This extra material amount thus allows for greater reliability to the user in that once applied, the even application of such a roll material will be retained until transport is undertaken and delivery made to a processing location. Such extra material may also be supplied with exposed adhesive components (whether in terms of strips, areas, and the like) present thereon at the surface. Such an adhesive matrix, similar to such materials described herein, would be present on the wrap surface external to the subject bale in order to permit greater reliability of dimensional stability of the wrap itself once applied around the subject bale with multiple revolutions. In other words, the adhesive provides discrete portions of the wrap body surface that accord further contact and attachment of the multiple wrap layers surrounding the subject bale. In this manner, the wrap exhibits a reduced propensity for both unwrapping after application, as well as less chance of slippage of the wrapping material itself to ultimately keep the bale intact. Such an adhesive exhibits a suitable level of bonding strength to apply to the wrap material around such a bale, but also at a sufficiently low level to permit the supplied wrap prior to bale application to unwind from within the harvesting device easily and without undesirable retention therein.

Furthermore, as noted above, the waste material inherently present within typical bale wraps in utilization today is a significant problem. Such waste material includes not only the core, but also an amount of wrap material that is roughly the same width as that of a typical wrap itself and typically from twelve to fifteen feet in length. When a roll is exhausted, the core and waste material will typically be disposed of at the field site itself. Unless the user then returns to pick up the waste materials, these are typically left in the crop field, contributing to litter in such a manner. To remedy such a problematic issue, it was found that such a wrap material may be supplied with zero waste, but with sufficient back tension to accommodate the necessary actions and operations of the wrap material when maneuvered by the harvesting machine during use. Upon proper contact and adhesion to the core, even with limited surface area supplied from the wrap material for such a purpose, suitable tension levels are supplied for proper and reliable utilization thereof to unwind the entirety of the final available wrap to sufficiently wrap the subject round bale. Once the final trailing edge of wrap material is separated from the roll of wrap material core, then all that remains is the wrap material core with a slight amount of adhering material on the surface of the core, allowing a user to simply remove the empty core and replace it with a full roll core of wrap material for further utilization in the field. The empty roll core may then be easily discarded without a loose polymeric material allowed to blow around (e.g., be subject to the elements) upon removal from the harvesting machine. Thus, with this specific core attachment in place, more efficient and cleaner operations are accorded. This beneficial addition may be undertaken individually or in combination with any or all of the other properties described herein for the inventive wrap material. The adhesion of the wrap material to the core can be accomplished by products such as hook and loop or adhesives with good release properties. Additionally, however, the end structure of the last wrap can actually be wound against itself around the core without the utilization of any adhering product and still unwind and properly expose the tab adhesive on the trailing edge for application to the wrap around the bale. Such non-adhered end structure may, however, include an adhesive matrix on the wrap surface that is not in contact with the core. Such a matrix imparts resilient strength around the core without requiring any adhesive attachment between the wrap and the core. In this manner, the wrap material would be wound around the core with the last one or more material levels including discrete areas or strips (or the like) of adhesive applied to ensure adhesion between such wound levels of the wrap itself. This provides a certain bonding strength to prevent unwanted slippage of the wrap material from around the core while still exhibiting a suitable low level of adhesion such that unwrapping does not require inordinately high pulling forces from the harvesting device during utilization. Such alternative end structures for bale wrapping materials have been unexplored in the past.

Additionally, with the need to ensure that the subject wrap application device (e.g., a harvesting machine) properly allows for stoppage of the unwinding of the wrap material during operation, specifically in order to ensure sufficient tension is supplied to the wrap to separate the trailing and leading edges of adjacent segments, a stop action (e.g., a clutch/brake mechanism) or separation component, is used. To notify the machine of such an instance, as noted previously, the wrap includes a label with appropriate indicators present thereon for a reader embedded or otherwise associated with the harvester to scan and read for such a desired action to commence. The typical wraps in use today are limited to a very specific location for the placement of such labels in order to activate the clutch/brake at a specific time during wrapping. In essence, due to the prior art of folded web structures in place, a certain amount of time and rate of movement is needed to allow the folded configuration to open as well as the adhesively connected separate materials to come apart. Any farther from the trailing edge (which is provided, in every instance, as a straight line across the width of the wrap material) and the label would indicate movement too soon, thus leading to improper opening and application of the overall wrap. If the label is too close to the trailing edge, then, the device may operate the clutch/brake too late, leading to improper unwinding and application of the wrap around a selected bale (including highly undesirable and wasteful double wrapping). Thus, the current wrap articles require specific distances for the indications to be read and acted upon. Any deviation will be troublesome.

The present invention, to the contrary, allows for placement of a label for such a purpose at a range of distances on the web material proximal to the trailing edge. Thus, label placement anywhere from $1/16^{th}$ of an inch to 30 inches from the further point of the trailing edge may be employed as a potentially preferred embodiment for such a purpose. However, the actual placement may be any location within the subject wrap segment dependent upon a number of factors, including, without limitation, the separation mechanism, the clutch/brake mechanism, and/or the roll mechanism, as well as the actual objects to which such a material is being applied. Upon activation, the clutch/brake can appropriately operate to maximize efficiency in relation to needed tension for separation to occur, as well as to ensure that undesirable possible entanglements between the wrap material and the harvester machine are avoided. Such labels may thus be printed, applied (as a sticker, for instance), painted, etc., to the wrap material surface within the range of distances noted above. This versatility allows for control of the clutch operation of a harvester to achieve total wrap leading and trailing edge separation and avoid double wrapping, as well.

Of further development in this area, it was realized that with pointed structure (e.g., chevron) configurations for the wrap segments themselves, the potential for trailing edge portions to tear during separation from a leading edge, particularly at the thinning ends thereof, may create a number of problems. These would include many of the same indicated above, such as the lack of resilient adhesive portions on such a pointed structure trailing edge to properly attach to a wrapped bale. If such a trailing edge exhibits a significant reduction in peel or shear strength at the wrap/bale interface, the entire wrap may unwind therefrom, leading to catastrophic results in the field. Additionally, any tears of this type may leave extended wrap material that may become entangled within the harvester machinery, or, at least, may cause the undesirable recoil therein, as described above. In any event, the ability to reduce the propensity for such trailing edge portion damage during separation may be overcome through provision of easier-to-separate attachments within the pointed structure trailing edges of such wrap segments. In essence, such structures may be provided with fewer and greater spaced slits, perforations, etc., in these regions to facilitate such separation with lower amounts of force needed for such a purpose. In this manner, such separation is achieved in a more reliable manner for these specific trailing edge locations, leaving the pointed structures intact, with a far lower propensity for tear potential and thus entanglement (or other like problem) during operation. Such is described in greater detail below.

DETAILED DESCRIPTION OF THE DRAWINGS AND PREFERRED EMBODIMENTS

The following descriptions and explanations of the accompanying figures are intended specifically to provide information pertaining to possible embodiments of the present invention. No limitation of the breadth and scope of the overall invention is to be construed by the disclosures provided herein.

With reference now to the Drawings, a wrapping material according to the present invention is illustrated. Such wrapping materials are provided in an elongated, continuous sheet form in separable wrapping segments stored consecutively on a reel or a core. Such a wrapping material, as described above, may be utilized for use in wrapping of solid objects, here, in particular, for the potentially preferred embodiments described herein, agricultural products, such as cotton, and may be composed of one or more of a variety of materials including, without limitation, polyolefin films, polyolefin nettings, mesh, and woven or fibrous materials, The width of such a wrapping material should be sufficient to cover the width of the subject bale or other item being wrapped including overlapping and sealing ends that are thick enough to withstand the handling and elements of nature if left in an agricultural field for a period of time surrounding a subject bale. Generally, the thickness of a potentially preferred agricultural wrapping material substrate is from about 40 to about 120 microns and the length of a wrapping segment is from about 15 to about 25 meters, depending upon the harvested material. It would be well understood by the ordinarily skilled artisan that such an inventive wrap is scalable to any desired size for different types of wrapped materials. For the baling process, sufficient wrapping material is contained on a supply reel or core to yield a field supply roll of sufficient wrapping segments for harvesting a multiplicity of round bales. The amount of wrapping material on the supply roll would be limited to the capacity of the harvesting machine in terms of the storage and technological capabilities of said harvesting machine. With that basic background provided, the invention may be better understood with the following descriptions and explanations, particularly as the inventive wrap and method of utilization thereof accords significant improvements over the state of the art now employed in the field.

Figure 1:
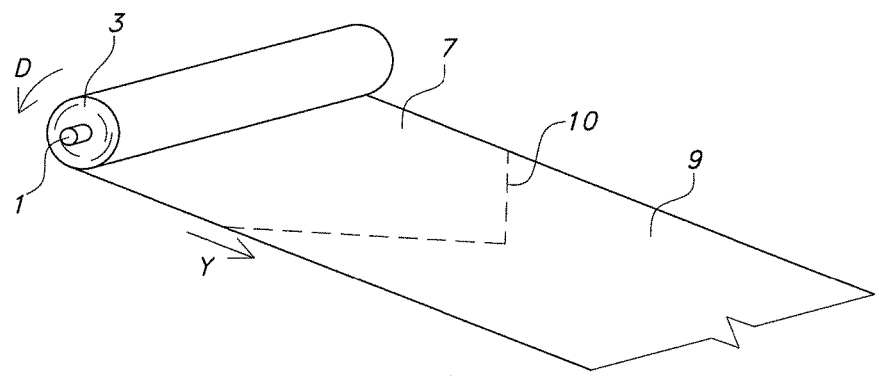
FIG. 1 is a perspective view of a prior art wrapping material during the unwinding phase of a roll of wrapping material.
Figure 2:
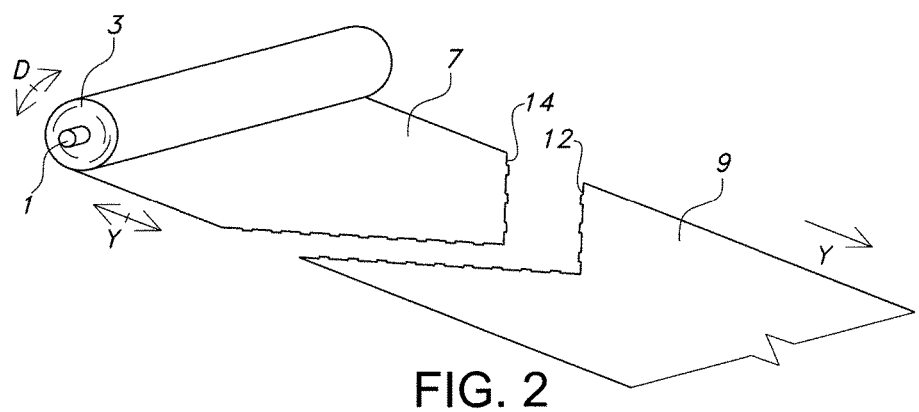
FIG. 2 is a perspective view of the same prior art wrapping material of FIG. 1 subsequent to a separation between the connected materials.
Figure 3:
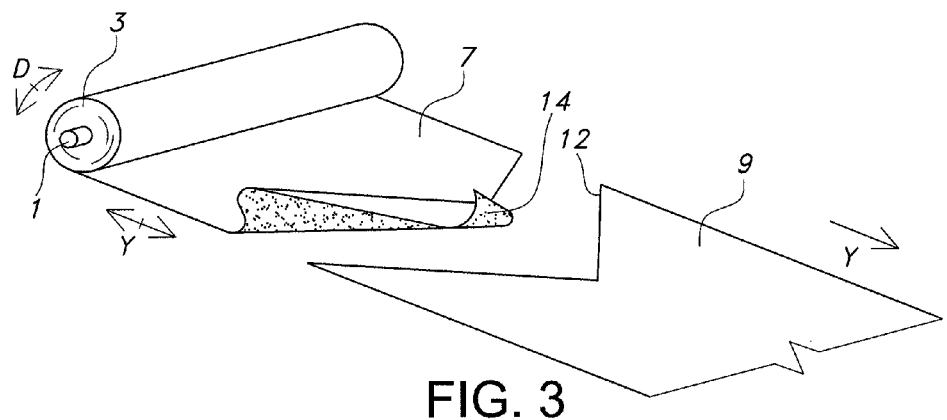
FIG. 3 is a perspective view of a prior art wrapping material during the unwinding phase of a roll of wrapping material showing a recoil event.

For reference purposes, FIGS. 1-3 provide a view of a prior art bale wrap 3 rolled on a core 1. The wrap 3 has multiple segments 7, 9 each separated by a scored line 10 (such as by slits, perforations, and the like, as described above). As the wrap 3 moves around the core in direction D the segments 7, 9 move likewise in direction Y. Within a harvester (not illustrated) the core wrap segment 7 is stopped and the leading segment 9 is pulled away, causing separation between the two segments 7, 9 with a leading edge 14 on the core segment 7 and a trailing edge 12 on the leading segment 9. This loose leading edge 14, as shown in FIG. 3, may allow for the formation of elongate or fibrous pieces of wrap material which can become co-mingled with the substance being wrapped. The loose leading edge may also be twisted or undesirably allowed to flap thereafter, which may lead to capture within the harvester machinery (not illustrated).

Figure 4:
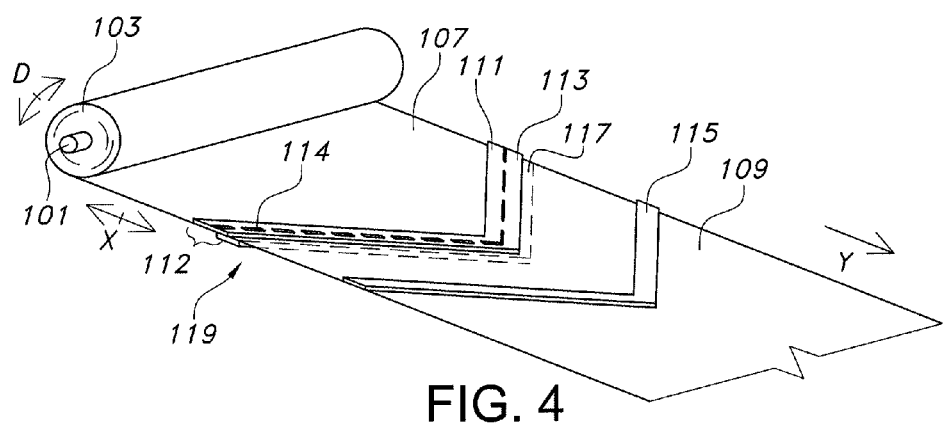
FIG. 4 is a perspective view of an inventive wrapping material with overlay present on the edges thereof.
Figure 5:
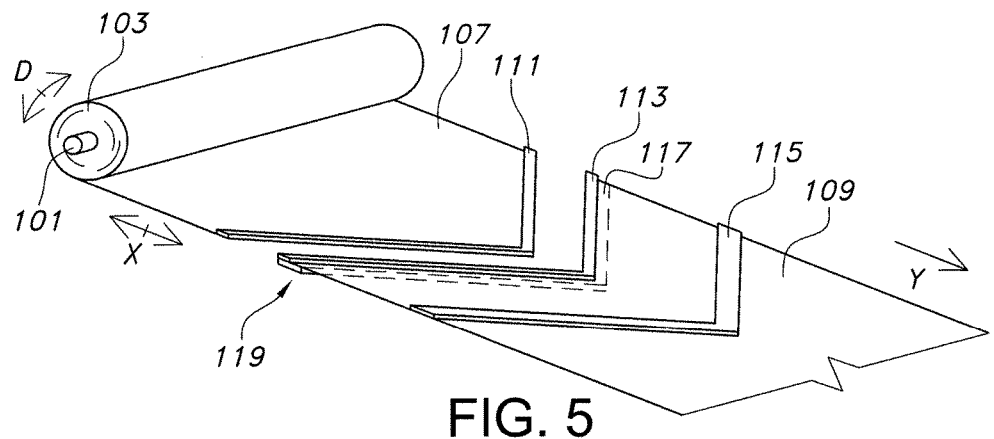
FIG. 5 is a perspective view of the wrapping material of FIG. 4 showing separation of the overlay present during separation of two wrapping material portions.

Such a deleterious effect may thus be remedied with an overlay as shown in FIGS. 4 and 5. The wrap 103 is present, again, on a core 101, with multiple segments 107, 109 separated by a scored line 114. A trailing section segment 107 has a leading edge covered by an overlay 111 and a leading section segment 109 that has a trailing edge covered by an adjacent overlay 113. The entire overlay 112 is applied as a single structure scored (perforated, etc.) with the aforementioned scored line 114 therein at any location. The scored (perforated, etc.) line 114 thus actually provides a line of demarcation not only within the entire overlay 112 but also between the edges of the leading and trailing section segments 107, 109 that permits separation thereof. Also present is an underside adhesive layer 119 to allow for adherence to a bale wrap of the leading section segment 109. The trailing end 117 of the leading section segment 109 includes a releasable substrate (such as a liner) 115 that protects the adhesive layer 119 during the unwinding phase and may also provide extra structure to the trailing end 117 upon separation from the trailing section segment 107. As above, then, upon movement of the wrap 103 around the core 101 in direction D, and subsequently stoppage X of the trailing section segment 107, the leading section segment 109 follows in direction Y and the entire overlay 112 and leading and trailing edges covered thereby of the two segments 107, 109 are then separated, as shown in FIG. 5. This leaves the remaining leading edge overlay portion 111 on the trailing section segment 107 and the remaining trailing edge overlay portion 113 of the leading section segment 109, imparting greater rigidity and/or structure to the trailing section segment 107 edge, thereby preventing formation of elongate or fibrous pieces of wrap material, or twisting or other possible entanglement with harvester machinery (not illustrated). The entire overlay 112 may be applied to the opposite side of the subject wrap material instead, as an alternative; the adhesive and releasable substrate may also be alternatively applied to the opposing material side, too. Likewise, it should be understood that the roll direction D may be in either configuration allowing for the wrap material to go under or over (here, under is shown) the roll.

Figure 6:
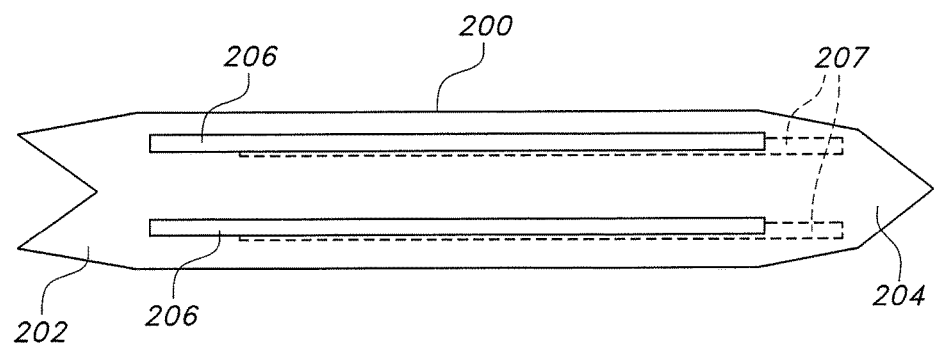
FIG. 6 is an aerial view of an inventive wrapping segment with rigidifying portions present longitudinally within the body section therein.

FIG. 6 provides an aerial view of an individual wrap segment 200 having a leading section 204 and a trailing section 202. As noted above, there are distinct potential problems with wrap materials that are askew on a bale or, alternatively, are susceptible to expansion or other distortion after application around a bale. To combat such an issue, resilient longitudinal strips 206 are integrated within or applied on the surface of the wrap segment 200 within the body thereof to accord greater dimensional stability during and after wrapping is completed. Such strips 206 are shown here as two parallel structures, although there may multiple structures, if desired, with staggered lengths within the body of the segment 200. Other geometric configurations may be utilized as well for such dimensional stability purposes within the body of the segment 200, if desired. Such strips 206 may also be provided with adhesives thereon or therein with a complementarily configured releasable substrate 207 placed there over that provides protection of the adhesive during an unwinding phase and, upon automatic removal of the releasable substrate during unwinding, adhesive access to impart further slippage reduction characteristics of the subject wrap material when present around a wrapped bale (such as in FIG. 14).

Figure 7:
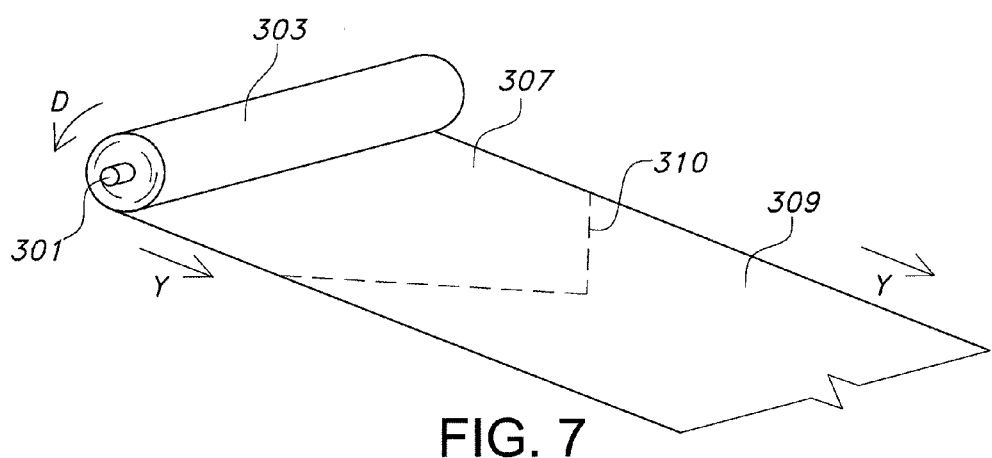
FIG. 7 is a side perspective view of an inventive wrapping material showing rigidifying portions present separately within the body section therein adjacent the leading section.
Figure 7A:
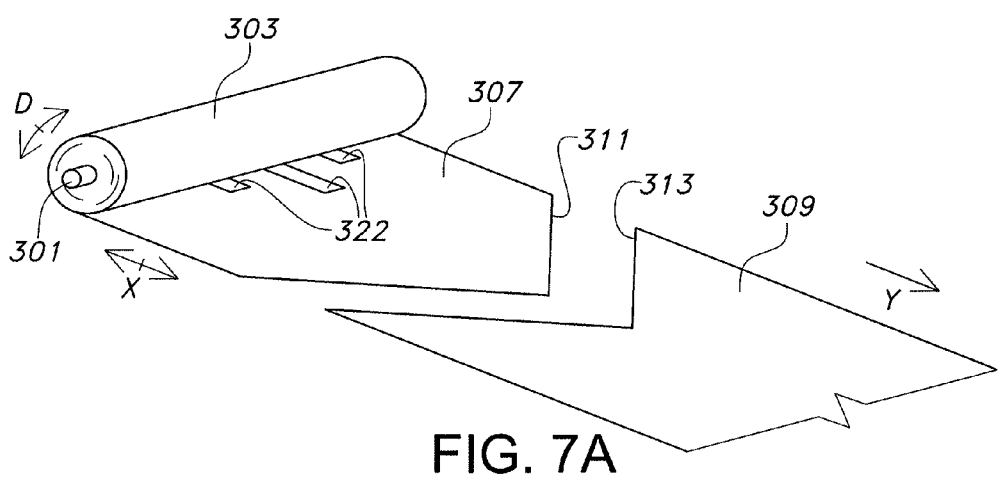
FIG. 7A is a side perspective view of the wrapping material of FIG. 7 after separation.

FIGS. 7 and 7A illustrate the utilization of rigidifying portions 322 at a location near separable connectors 310 (such as scoring, perforations, etc.) between section segments 307, 309 in order to reduce the propensity for undesirable movement of such an edge 310 after separation of the section segments 307, 309. Such a configuration is distinctly different from any placement of dampening strips, for instance, within the pointed area of the leading end of such a segment 307. In this fashion, the rigidifying portions 322, which may be applied as overlays or extra material within their specific regions, situated behind the pointed edge 310 thereof, accords a certain degree of control and resiliency without having to introduce such structures closer to the edge 310. In this manner, then, the wrap 303, present on a core 301, may include the simpler scored line 310 between a trailing segment 307 and a leading segment 309 with reduced propensity for twisting or flapping thereof upon separation (as shown in FIG. 7A) with the wrap 303 unwinding in direction D (as above, such a direction may be the opposite of that shown and over, rather than under, the wrap present on the core) and brake stop X (with the roll direction D, stopped as well as in FIG. 7A) applied to allow for the leading section segment 309 to detach while the leading section segment 309 moves in direction Y, leaving a trailing edge 313 thereof and a leading edge 311 of the trailing section segment 307 that remains dimensionally stable for further operation.

Figure 8:
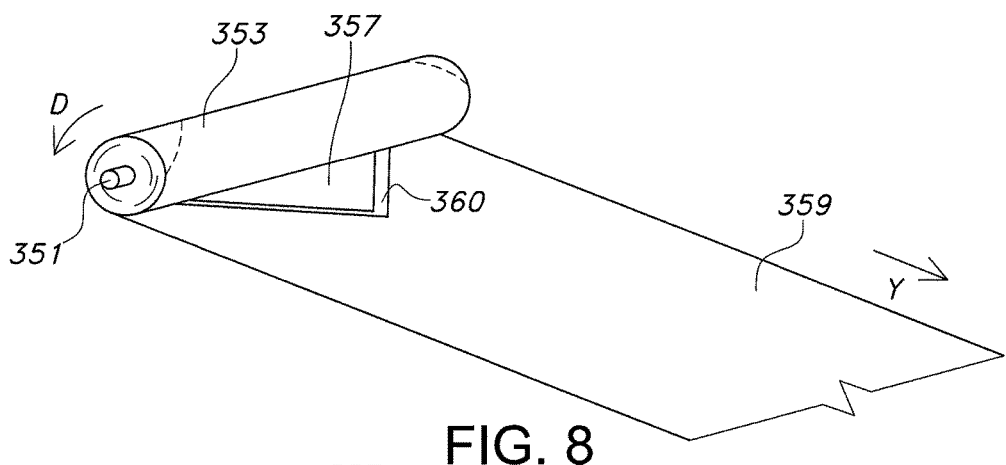
FIG. 8 is a side perspective view of an inventive wrapping material showing rigidifying portions present separately within the body section therein adjacent the leading section prior to segment separation initiated at the wrap.
Figure 8A:
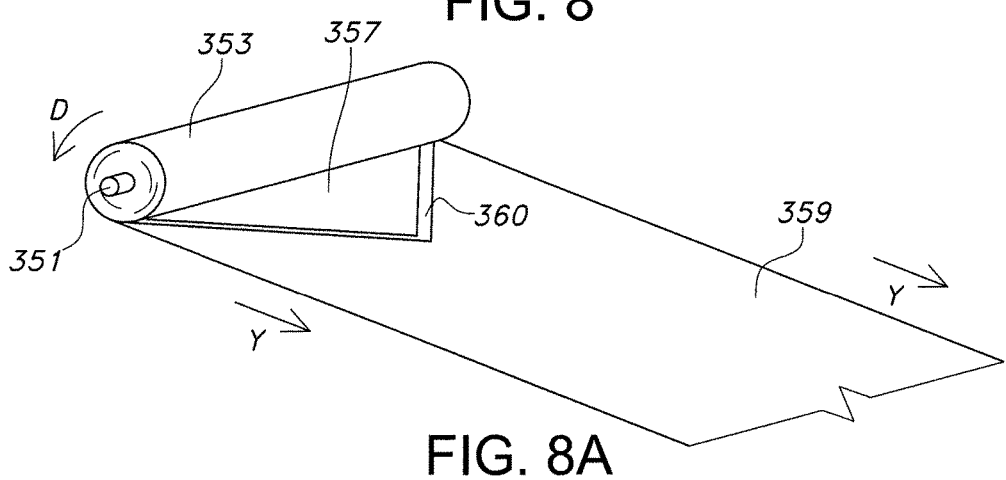
FIG. 8A is a side perspective view of the wrapping material of FIG. 8 after separation in relation to retention pressure on the core.
Figure 8B:
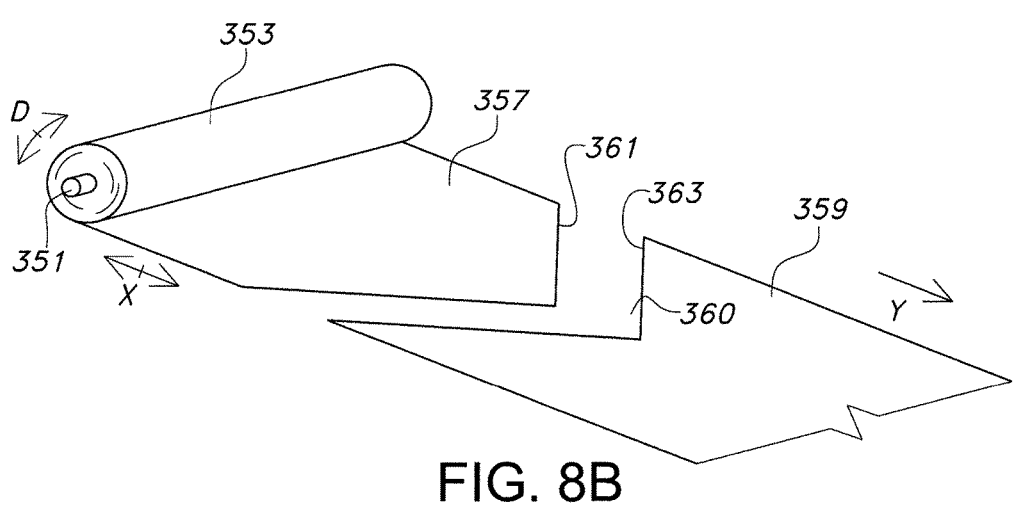
FIG. 8B is a side perspective view of the wrapping material of FIG. 8 after complete separation of the wrapping material segments with the leading segment still moving forward and the trailing segment stopped.

FIGS. 8, 8A, and 8B show a wrap material structure 353 with the separation between leading and trailing section segments 357, 359 accomplished through unwinding in direction D and movement of the materials in direction Y and including a sufficient stress differential accorded the wrap material 353 in relation to the retention of the trailing section segment 357 on the core 351 and the unwound leading section segment 359. In essence, the separable connectors 360 allow for lower stress differentials to permit such separation, ostensibly resulting in such separation once the leading section segment 359 is free from the wrap 353 around the core 351 in its entirety, thus facilitating such separation without any need for brake stopping (as for D and X in FIG. 7A, for instance) of the harvesting device (not illustrated) during operation. As the wrap 353 unwinds in direction D, the leading segment 359 moves in direction Y and continues as the connectors 360 begin separating (FIG. 8A) leaving, in FIG. 8B, a trailing edge 363 and a leading edge 361 in the segments 357, 359. Only when the leading segment 359 is clear of the roll 353, and the rigidifying portions 372 impart resiliency to the leading edge 361 of the trailing segment 357, the trailing segment 357 can be stopped (D and X) without associated flapping, twisting, or other like issues (FIG. 8B).

Figure 9:
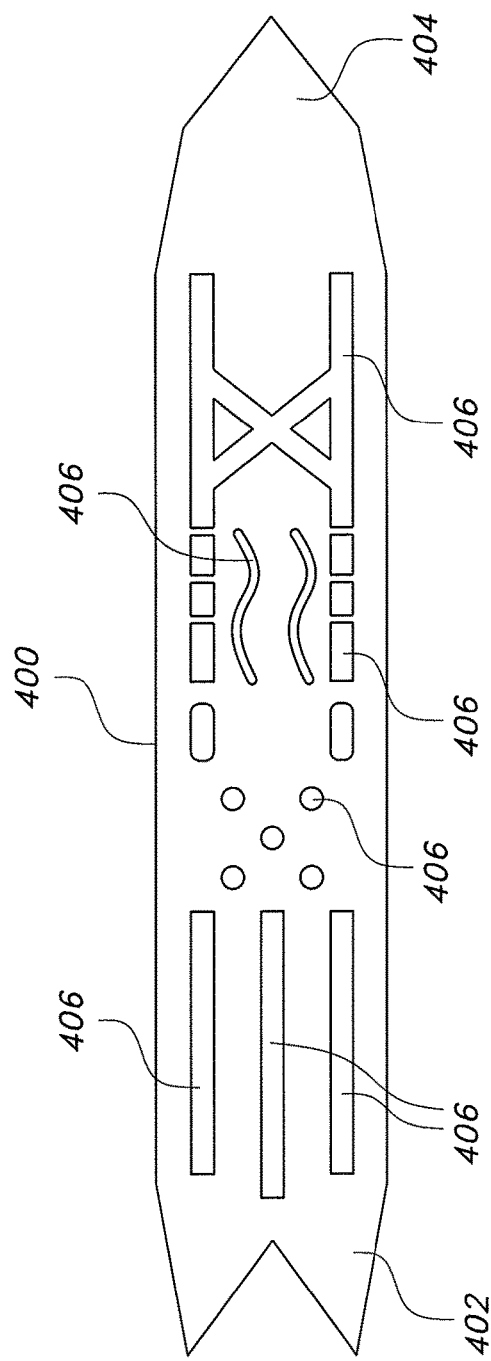
FIG. 9 is an aerial view of an inventive wrapping segment showing a variety of possible rigidifying surface additions within the body section thereof.

FIG. 9 thus a variety of possible configurations of rigidifying portions 406 of a wrap segment 400. Such a specific configuration of such portions 406 is not intended to be required; this Figure simply shows non-limiting possible configurations of rigidifying portions 406 that may be utilized for such a purpose. In this alternative, the leading end 404 and trailing end 402 are separated by a central structure of strips 406 for such a purpose. The presence of such a structure 406 within the body of the segment 400 accords dimensional stability as provided by both the structures of FIGS. 6 and 7, above. Such structures 406 may also include strips or at least discrete applications thereon at their surface of exposed adhesives (not illustrated) analogous to the releasable substrate shown in FIG. 6, for the purpose of protecting the adhesive during unwinding, for example. Such adhesives would impart greater strength to the multi-wound subject bale wrap, allowing for greater resistance to slippage of such wound material as well as drastically reduced potential for peel and shear thereof, as well.

Figure 10:
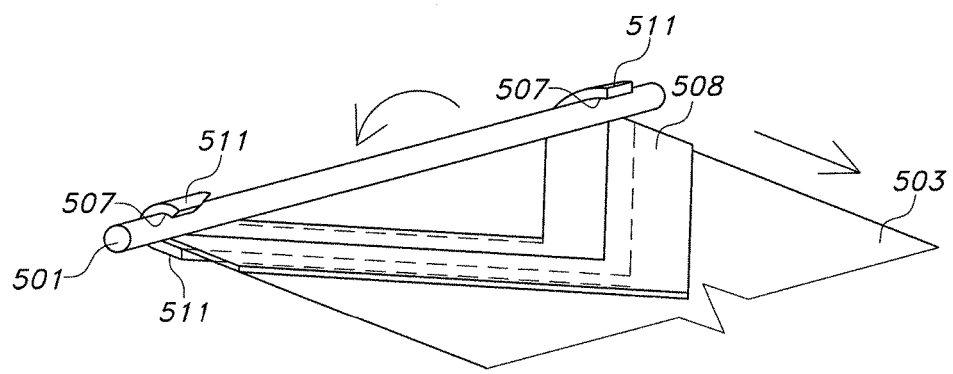
FIG. 10 is a side perspective view of a roll core to which a final segment attached to a final trailing edge of wrapping material has been adhered.
Figure 10A:
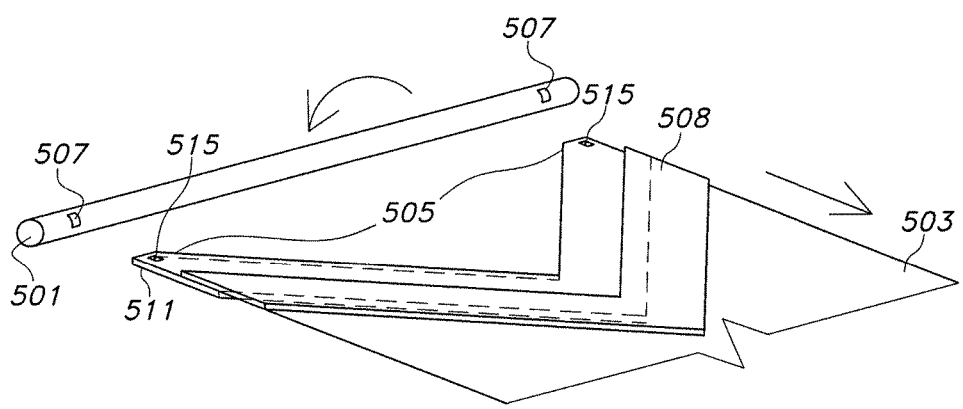
FIG. 10A shows the separation of the final segment from the core of FIG. 10.

FIGS. 10 and 10A provide views of the novel utilization of a suitable adhesive at the end of an entire wrapping material roll 503 in order to allow for reliable attachment (in releasable fashion) to the subject core 501. As noted, the end wrap segment 503 includes juxtaposed regions 505 that emulate, to a certain degree, the trailing edges (313 of FIG. 7A, for example) of potentially preferred wrap segments (as discussed above). Certainly, as noted, this configuration is not presented as limiting to any degree, as any suitable geometric shape may be utilized in this manner. Here, however, these ends 505 include adhesive release tabs 515 (FIG. 10A) thereon that allow for attachment to adhesive areas 507 on the core 501, allowing, ultimately, the ability to utilize the entirety of the wrap material on a provided roll (e.g., preventing any need for waste material to be generated). As well, the wrap 503 includes adhesive edges 511 opposite the adhesive release tabs 515. In FIG. 10A, the wrap material 503 is separated from the core 501, and the adhesive edges 511 of the end portions 505 may thus be applied to a wrapped bale (such as in FIG. 13) in secure fashion, just as any other prior segment trailing edge including a release substrate 508 that protects the adhesive 511 as described previously. The core 501 thus retains adhesive locations 507 thereon, as well.

Figure 10B:
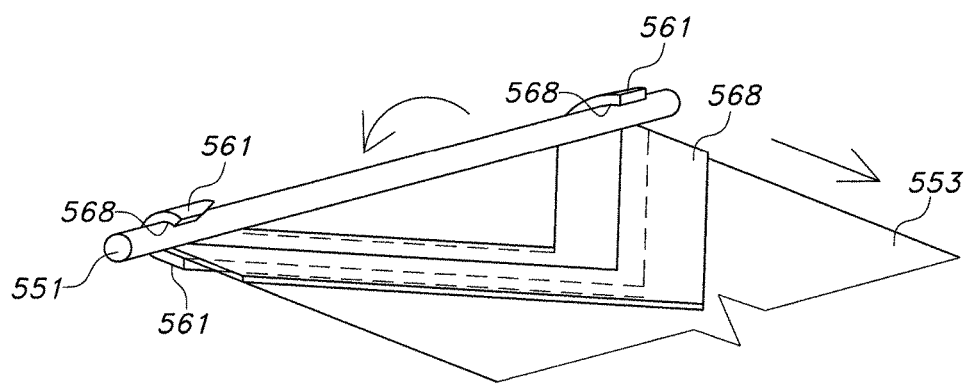
FIG. 10B is a side perspective view of a roll core to which a final segment wrapped around the core.
Figure 10C:
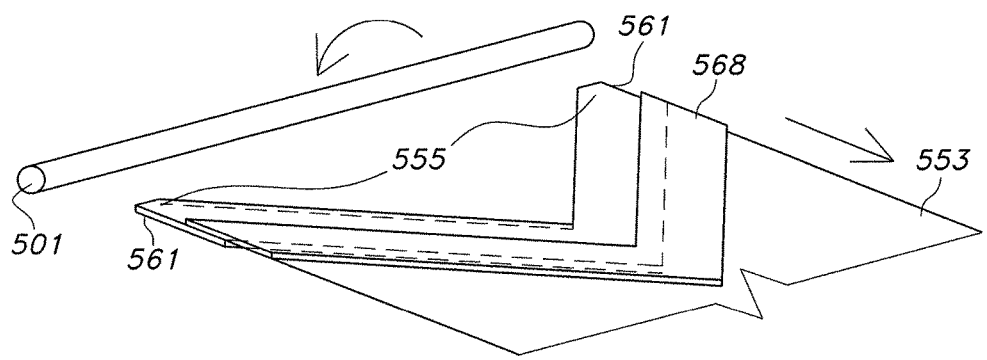
FIG. 10C shows the unwrapping of the final segment from the core of FIG. 10B.

FIGS. 10B and 10C provide views of the novel utilization of a suitable adhesive at the end of an entire wrapping material roll 553 in order to allow for reliable attachment (in releasable fashion) to the subject core 551. As noted, the end wrap segment 553 includes juxtaposed regions 555 that emulate, to a certain degree, the trailing edges (313 of FIG. 7A, for example) of potentially preferred wrap segments (as discussed above). Certainly, as noted, this configuration is not presented as limiting to any degree, as any suitable geometric shape may be utilized in this manner. Here, however, these ends 555 include adhesive materials 561 thereon and/or therein that allows for attachment to another area of the wrap 553 when wound around the core 551, thus being retained on the core 551 through tension. This ultimately provides the ability to utilize the entirety of the wrap material on a roll, thereby preventing any need for waste material to be generated. In FIG. 10C, the wrap material 553 is unwound from the core 551 and upon release of the adhesive from the release tabs 568 on the wrap material 553, the last segment of the wrap material unwinds completely from the core 551, leaving no wrap material or adhesive thereon.

Figure 10D:
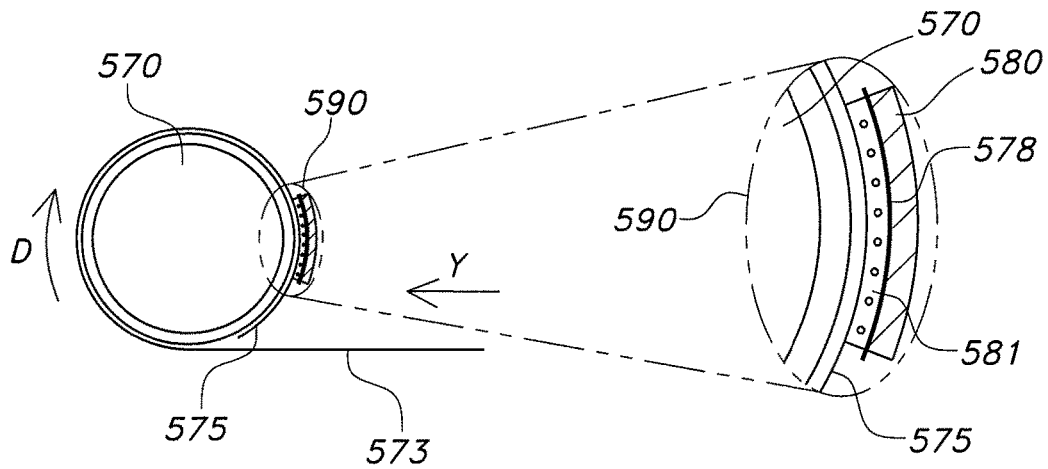
FIG. 10D is a cross-sectional view of the core and wrap material of FIG. 10 showing the initial winding of the wrap onto the core.
Figure 10E:
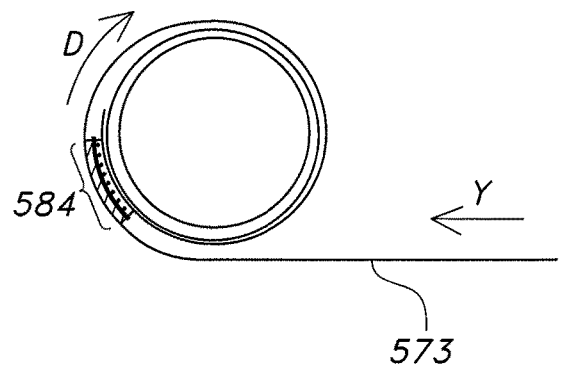
FIG. 10E shows a cross-sectional view of the core and wrap of FIG. 10D with the continued winding of the wrap onto the core.
Figure 10F:
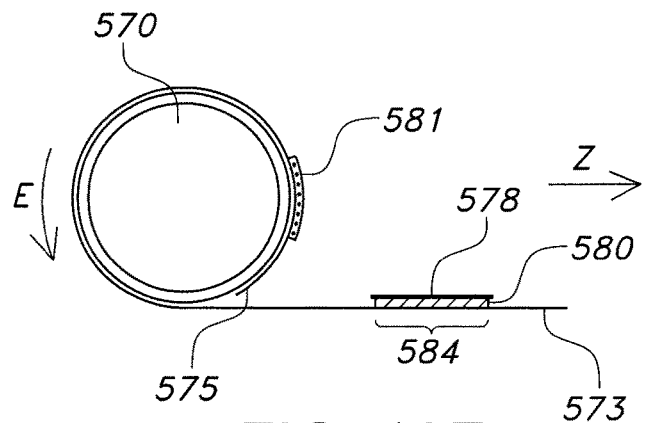
FIG. 10F is a cross-sectional view of the core and wrap of FIG. 10D showing the initial unwinding of the wrap from the core.
Figure 10G:
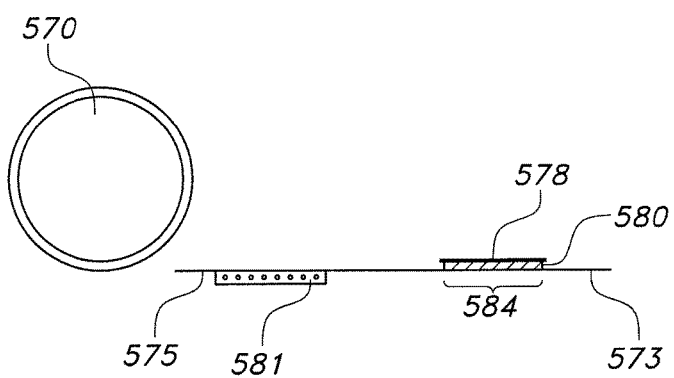
FIG. 10G shows the cross-sectional view of the core and wrap of FIG. 10F and the complete separation of the wrap from the core.

FIG. 10D provides a cross-sectional view of one potentially preferred embodiment of the core 570 and the last segment of the wrap material 573 as it is applied to the core 570. The core 570 turns in direction D while the wrap 573 moves toward and around the core 570 in direction Y. On the trailing portion 575 of the wrap material 573 there is supplied an adhesive 581 covered with a release liner 578 and a second exposed adhesive 580. In FIG. 10E, after further movement of the core 570 in direction D and the wrap material 573 in direction Y, the exposed adhesive 580 adheres to the wrap material 573 at its contacted surface 584. The wrap 573 and core 570 then continue to wind until the entire wrap 573 is rolled thereon. Such adhesive composites including the adhesive 581, liner 578, and exposed adhesive 580 are provided throughout the wrap material in intervals relative to the trailing edges of each wrap segment. FIGS. 10D, 10E, 10F, and 10G show the last segments including these adhesive composites; it should be well understood that such components are present throughout the entirety of the wrap material, with, for instance, the adhesive composites and adhesives 581, liners 578, and exposed adhesives 580 configured in any desired shape and/or alignment thereon and/or therein (such as the pointed structures 115, 119 of FIG. 5, as one example). FIGS. 10F and 10G thus show the resultant effect of such adhesive composites upon unwinding of the subject wrap material 573 from the core 570. Upon wrap movement in direction Z and core rotation in direction E, the adhesive 581 remains attached to the wrap material 573 near the trailing edge 575 and the exposed adhesive 580 remains attached to the wrap material 573 at its contact location 584. The release liner 578 releases from the adhesive 580 and remains in contact with the exposed adhesive 580, thereby resulting, as shown in FIG. 10G, in an exposed release liner 578 on the top surface of the wrap material 573

(or bottom surface, depending on the perspective and/or need of the user) attached via the exposed adhesive 580 and the adhesive 581 exposed on the opposing surface of the wrap material 573 adjacent the trailing edge 575, thus allowing for such adhesive 581 to contact and adhere to the wrap material 573 already in place and surrounding a subject object (as in FIG. 13, for example) to secure the wrap material 573 in its entirety thereto. As well, these FIGS. 10D, 10E, 10F, and 10G show the tension attachment of the wrap material 573 around the core 570 and the removal therefrom without any waste wrap material generated that requires disposal.

As such, it is important to note that adhesive capability or tension alone may be employed for the releasable attachment of the wrap material to the core. Additionally, it is noted that either the core 551 or the trailing edge of the last segment of the wrap material 553 may be provided in a certain manner to increase grip or to provide other attachment to one or the other for the purposes of providing reliable attachment between core and last wrap segment, if desired.

Figure 11:
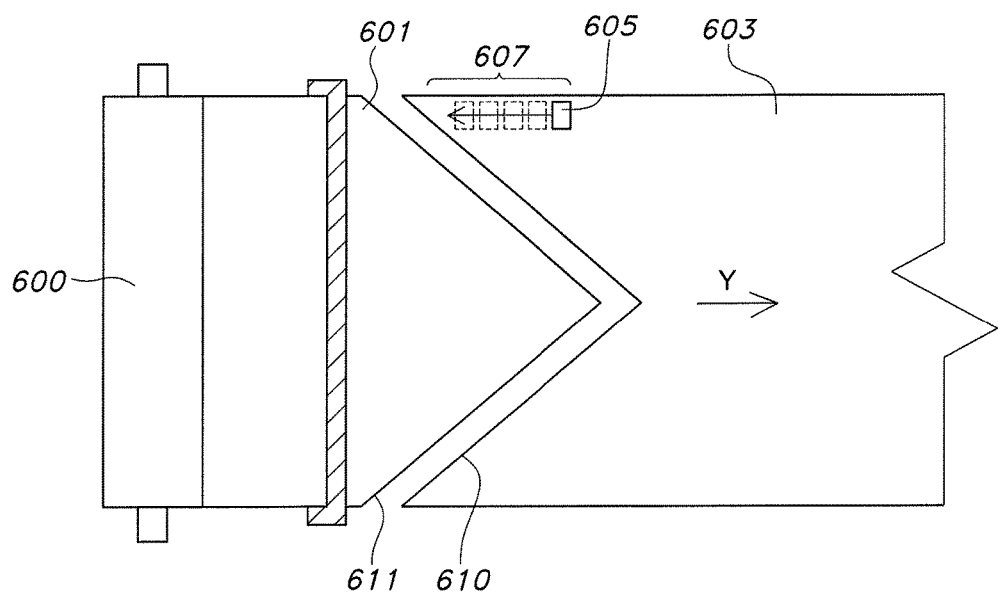
FIG. 11 is an aerial view of an unwound wrapping material showing a notification label positioned at various locations thereon (as alternatives).

FIG. 11 provides further improvement as the utilization of an inventive wrap material as herein described. A label 605 is typically provided on wrap segments 601, 603 to facilitate activation of a clutch/brake mechanism (not illustrated) of a rolling device (not illustrated), such as, for instance, as one non-limiting example, a harvesting device that collects and wraps a bale. Typically, as noted above, these labels are applied at a specific location on such segments in order to ensure proper reading by a sensor 620 to activate the brake stop (not illustrated) (or, for other rolling devices, stop or separating mechanisms, as needed), thereby allowing for separation of segments to occur. In this FIG. 11, then a wrap roll 600 includes a label 605 that may be introduced at any location within the trailing edge region 610 of a wrap segment 603. Such locations 607 thus allow for greater versatility as well as potentially greater versatility overall for the operation of the harvesting device to properly brake stop and allow for definitive separation of segments 601, 603, leaving a leading edge 611 for a trailing segment 601 in addition to the trailing edge 610 of a leading segment 603. This ability for label placement selection is starkly divergent from the prior art that typically utilizes a straight, perpendicular separation line between segments. Such a label 605 must be situated in one spot for activation purposes, basically, leaving the overall wrap susceptible to less control by the harvester device to operate appropriately. The configuration shown, as well as other geometric shapes and arrangements, allows for such versatile label positioning, thus, again, according greater control potential and more reliable utilization thereof. As well, as noted previously, such a label 605 may be supplied in any location of the subject wrap for such control purposes, dependent upon the subject objects to be wrapped and machinery utilized therefore and therewith. The label 605 may be of any indicator that provides an effective means to signal when a specific location of a subject wrap segment reaches a certain place within the rolling device that subsequently activates the device as needed (separation, braking, etc.). Thus, such an indicator may be any type of structure, addition, structural change, etc., that can provide a differential change for such a signal purpose (read or detected by a suitable component on the rolling device, for instance, include a color, light, laser, etc., sensor, and the like). Indicators may thus be bar codes, QR codes, colors, opaque structures, transparent wrap areas, basically anything that accords such a beneficial signal result that is specific for the necessary location within the wrap material for such a purpose.

Figure 12:
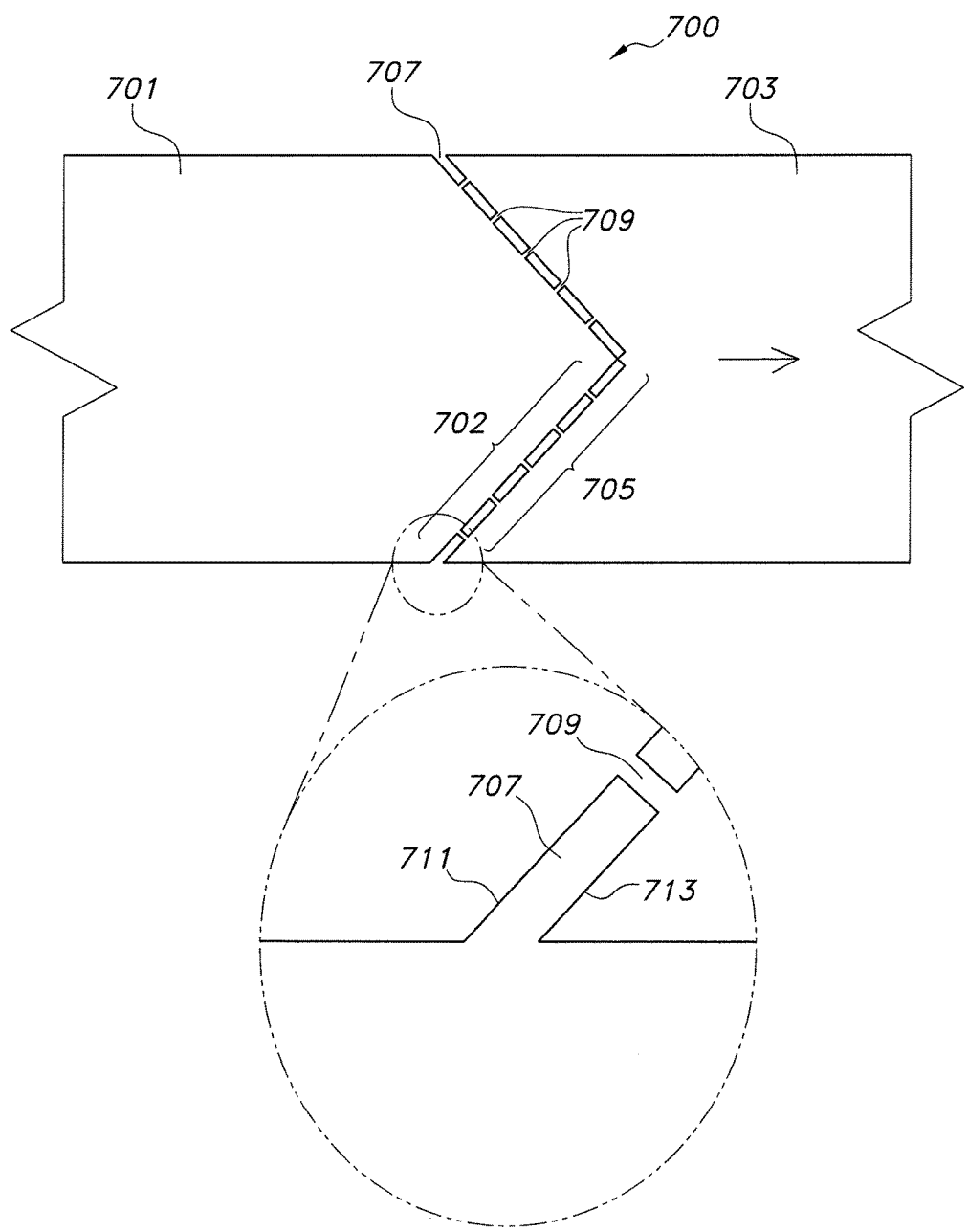
FIG. 12 is an aerial view of a trailing and leading edge of connected wrap materials prior to separation and including weakened connections within the pointed structures of the trailing ends thereof.

FIG. 12 thus provides an aerial view of the interface of two segments 701, 703 of a wrap material 700 with limited connections 707, 709 therein that noticeably do not connect at the side edges of the wrap 700. Such a disposition of connections 707, 709 best ensure effective separation occurs of the two segments 701, 703. The leading edge 702 of the trailing segment 701 and the trailing edge 705 of the leading segment 703 thus are more easily separated when sufficient, low force is applied for such an action. This allows for greater reliability of the pointed structure ends of the trailing edge 705 of the leading segment 703 to remain intact subsequent to separation, reducing the potential for tearing or other deleterious result within the materials of the trailing edge 705, ultimately providing for greater reliability that such pointed structure edges 705 will not become entangled within the harvesting device machinery (not illustrated). If desired, however, in order to impart greater resiliency to the wrap material in total during both manufacturing and unwinding to reduce the potential for problematic foldback, a nib connector (or other like structure) may be provided intact and exhibiting sufficient strength for such a purpose may be supplied proximate to the leading and tailing edges 711, 713, thereof.

Figure 13:
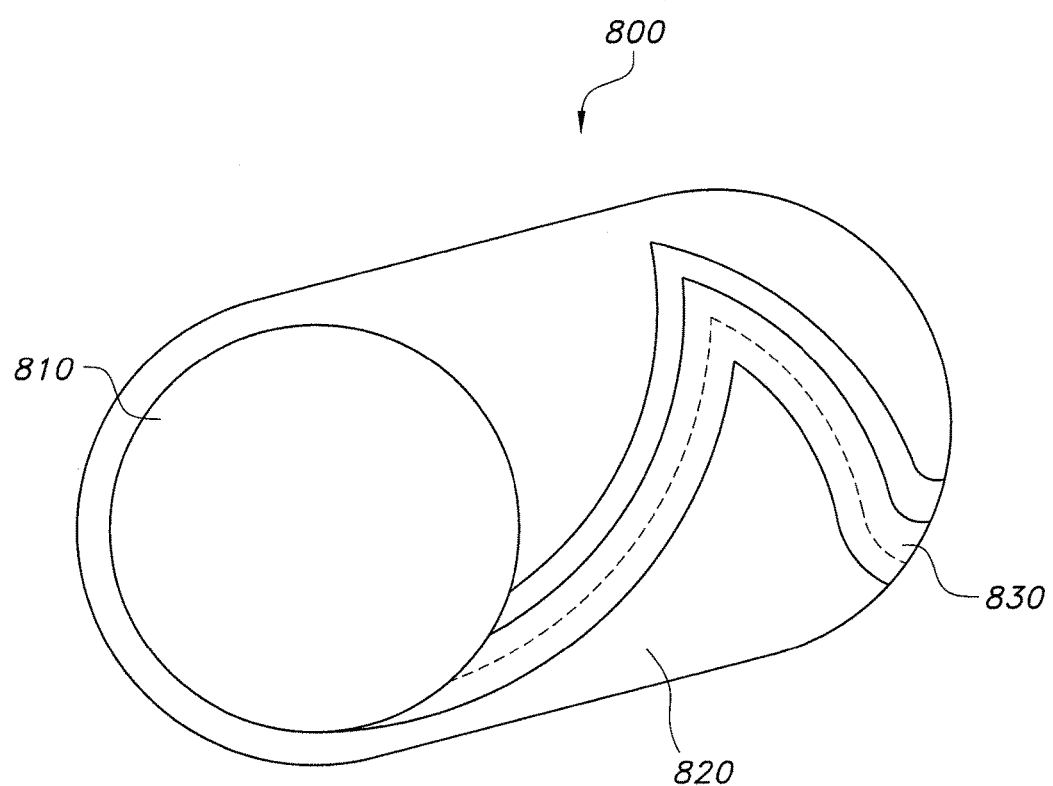
FIG. 13 shows a side perspective view of a wrapped bale including the wrap material of FIG. 5.

FIG. 13 shows a multi-wound bale 800 including agricultural product 810 (such as, as one non-limiting example, cotton) and the wrap material 820 as provided in FIG. 5, above with the trailing edge 830 adhered to the wrap material 820. The other wrap materials of the inventive Figures, above, would be wound in like fashion and to similar effect for the wrapping of any desired solid object or objects.

Such improvements as outlined and described in greater detail above accord a user for greater reliability in the field than standard wrapping materials now employed for such purposes. Whether there is provided edge overlays, rigidifying structures, fully removable and usable wrapping materials from a subject core, a multi-positioned label, and/or carefully constructed perforations, etc., at edge interfaces of separable segments, these improvements all impart beneficial results that have heretofore been unexplored and certainly been unattainable in this industry.

The disclosed embodiments are to be considered in all respects as illustrative and not restrictive. Several embodiments are described and illustrated and suggest that there are others within the scope of the invention which meet particular requirements of an application which do not depart from the scope of the invention. The variety of adhesive configurations are illustrative of alternative solutions to the securing of a wrapper on a bale or any other type of solid object or objects. These are matters of design choice prompted by the characteristics of the material and contents of the bale being covered and its ultimate physical location. The scope of the invention is to be defined by the appended claims rather than the foregoing descriptions and other embodiments which come into the meaning and range of equivalency of the claims are therefore intended to be included within the scope thereof.

What we claim is:

1. A roll of continuous wrapping material for wrapping bales, comprising:
   a cylindrical core,
   a plurality of successive wrapping segments,
   wherein the plurality of segments comprises a first wrapping segment, a series of middle wrapping segments, and a last wrapping segment provided around said cylindrical core, said wrapping segments being connected to each successive segment through periodic separable connections, wherein each wrapping segment comprises a leading edge and a trailing edge, wherein the leading edge comprises a chevron shape configuration, wherein a configuration of said trailing edge is complementary to said chevron shape configuration of said leading edge, wherein said leading edge of each middle wrapping segments and last wrapping segment is adjoined to said trailing edge of an adjacent wrapping segment through said periodic separable connections, and wherein said last wrapping segment includes an adhesive component at its trailing edge in contact with said cylindrical core, wherein each of said adjoined leading and trailing edges has connected to it part of an overlay comprising a chevron shape configuration and said overlay including separable connections aligned with said separable connections between said leading and trailing edges;

wherein each wrapping segment includes rigidifying additions on a surface thereof and positioned adjacent to the periodic separable connections without touching the leading edge or the trailing edge, and wherein each wrapping segment comprises materials formed from a polyolefin.

2. The roll of claim 1, wherein said last wrapping segment includes releasable adhesive components applied thereto to increase retention strength around said cylindrical core during utilization within a harvesting device.

3. The roll material of claim 1 wherein the adhesive component of the last wrapping segment further comprises release tabs that attach to an adhesive area on the cylindrical core.

4. The roll material of claim 1, wherein the rigidifying additions include adhesive materials applied thereto having a releasable substrate applied over the adhesive materials.

5. The roll material of claim 4, wherein the rigidifying additions comprise longitudinal areas of overlay materials.

6. The roll material of claim 1, wherein the rigidifying additions comprise overlay materials heat welded or sonically welded to the roll material.

7. The roll material of claim 1, wherein the rigidifying additions comprise longitudinal areas of overlay materials.

8. The roll material of claim 1, wherein the rigidifying additions comprise overlay materials formed of shapes chosen from the group circular and curvilinear.

9. The roll material of claim 1, wherein the rigidifying additions comprise overlay materials in the form of dots.

10. A roll of continuous wrapping material for wrapping bales, comprising:

a cylindrical core, a plurality of successive wrapping segments, wherein the plurality of segments comprises a first wrapping segment, a series of middle wrapping segments, and a last wrapping segment provided around said cylindrical core, said wrapping segments being connected to each successive segment through periodic separable connections, wherein each wrapping segment comprises a leading edge and a trailing edge, wherein the leading edge comprises a chevron shape configuration, wherein a configuration of said trailing edge is complementary to said chevron shape configuration of said leading edge, wherein said leading edge of each middle wrapping segments and last wrapping segment is adjoined to said trailing edge of an adjacent wrapping segment through said periodic separable connections, and wherein said last wrapping segment is wound around said cylindrical core with an adhesive on a first surface of said last wrapping segment releasably adhering to a second surface of said last wrapping segment, thereby allowing said first and second surfaces to be pulled apart while not adhering said last wrapping segment to the core with another adhesive, wherein each of said adjoined leading and trailing edges has connected to it part of an overlay comprising a chevron shape configuration and including separable connections aligned with said separable connections between said leading and trailing edges;

wherein each wrapping segment includes rigidifying additions on a surface thereof and positioned adjacent to the periodic separable connections without touching the leading edge or the trailing edge, and wherein each wrapping segment comprises materials formed from a polyolefin.

* * * * *